United States Patent
Hamdi et al.

(10) Patent No.: US 8,041,380 B2
(45) Date of Patent: Oct. 18, 2011

(54) POWER CONTROL IN COGNITIVE RADIO SYSTEMS BASED ON SPECTRUM SENSING SIDE INFORMATION

(75) Inventors: Karama Hamdi, Hong Kong (CN); Wei Zhang, Hong Kong (CN); Khaled Ben Letaief, Hong Kong (CN)

(73) Assignee: Lingna Holdings Pte., LLC, Wilmington, DE (US)

( * ) Notice: Subject to any disclaimer, the term of this patent is extended or adjusted under 35 U.S.C. 154(b) by 793 days.

(21) Appl. No.: 12/099,886

(22) Filed: Apr. 9, 2008

(65) Prior Publication Data

US 2008/0268892 A1    Oct. 30, 2008

Related U.S. Application Data

(60) Provisional application No. 60/914,140, filed on Apr. 26, 2007.

(51) Int. Cl.
*H04W 52/24* (2009.01)

(52) U.S. Cl. .................. 455/522; 455/69; 455/67.11

(58) Field of Classification Search ................. None
See application file for complete search history.

(56) References Cited

U.S. PATENT DOCUMENTS

| | | | |
|---|---|---|---|
| 7,424,268 B2 * | 9/2008 | Diener et al. | 455/67.11 X |
| 7,801,490 B1 * | 9/2010 | Scherzer | 455/67.13 |
| 2004/0047324 A1 | 3/2004 | Diener | |
| 2007/0042733 A1 | 2/2007 | Tomioka | |
| 2007/0183392 A1 * | 8/2007 | Tandai et al. | 455/522 X |
| 2008/0207248 A1 * | 8/2008 | Tang | 455/522 |
| 2009/0270025 A1 * | 10/2009 | Kossi et al. | 455/522 X |

OTHER PUBLICATIONS

International Search Report and Written Opinion for PCT Application No. PCT/IB2008/003360, mailed May 26, 2009, 12 pages.
Hoven, et al. "Power Scaling for Cognitive Radio." International Conference on Wireless Networks, vol. 1, pp. 250-255, Jun. 13-16, 2005, retrieved on Apr. 28, 2009.
Hamdi, et al. "Power Control in Cognitive Radio Systems Based on Spectrum Sensing Side Information," ICC 2007 Proceedings (Online) pp. 5161-5165, Jun. 24-28, 2007, retrieved on Apr. 27, 2009.
Weiss, et al. "Mutual interference in OFDM-based spectrum pooling systems." In Proc. IEEE VTC, May 2004, vol. 4, pp. 1873-1877. Last accessed Aug. 4, 2008, 5 pages.
Chakravarthy, et al. Cognitive Radio—An Adaptive Waveform with Spectral Sharing Capability. IEEE Communications Society / WCNC 2005, New Orleans, USA, Mar. 2005, vol. 2, pp. 724-729. Last accessed Aug. 4, 2008, 6 pages.

(Continued)

*Primary Examiner* — Philip Sobutka
(74) *Attorney, Agent, or Firm* — Turocy & Watson, LLP

(57) ABSTRACT

For cognitive radio systems, the transmit power of a cognitive radio device is controlled so that the cognitive, unlicensed radio device does not interfere with the use of a shared spectrum by a primary, licensed device. Controlling the transmit power includes determining a distance, or a function of the distance, between a primary transmitter of the primary device and the cognitive radio device based on sensing information from a spectrum sensing process. The maximum transmit power of the cognitive radio device is then dynamically controlled based on the distance, or the function of the distance, while considering a worst case scenario of an underlying cognitive radio model, to guarantee a quality of service requirement of the primary device.

19 Claims, 13 Drawing Sheets

OTHER PUBLICATIONS

Hoven, et al. Power Scaling for Cognitive Radio. In: Proc. WCNC, Maui, Hawaii, USA, Jun. 2005, vol. 1, pp. 250-255. Last accessed Aug. 4, 2008, 7 pages.

Wild, et al. Detecting Primary Receivers for Cognitive Radio Applications. In: Proc. 1st IEEE Symp. New Frontiers in Dynamic Spectrum Access Networks (DySPAN'05), Baltimore, USA, Nov.8-11, 2005, pp. 124-130. Last accessed Aug. 4, 2008, 7 pages.

Sahai, et al. Some Fundamental Limits on Cognitive Radio. In: Proc. of Allerton Conf., Monticello, Oct. 2004. Last accessed Aug. 4, 2008, 27 pages.

Ghasemi, et al. Collaborative Spectrum Sensing for Opportunistic Access in Fading Environments. In: Proc. 1st IEEE Symp. New Frontiers in Dynamic Spectrum Access Networks (DySPAN'05), Baltimore, USA, Nov. 8-11, 2005, pp. 131-136. Last accessed Aug. 4, 2008, 6 pages.

* cited by examiner

POWER CONTROL IN COGNITIVE RADIO SYSTEMS BASED ON SPECTRUM SENSING SIDE INFORMATION

CROSS-REFERENCE TO RELATED APPLICATIONS

This application claims priority to U.S. Provisional Application Ser. No. 60/914,140, filed on Apr. 26, 2007, entitled "POWER CONTROL IN COGNITIVE RADIO SYSTEMS BASED ON SPECTRUM SENSING SIDE INFORMATION", the entirety of which is incorporated herein by reference.

TECHNICAL FIELD

The subject disclosure relates to power control based on spectrum sensing side information in cognitive radio systems.

BACKGROUND

By way of brief background, cognitive radio is a paradigm for wireless communication in which either a network or a wireless node changes its transmission or reception parameters to communicate efficiently without interfering with licensed users. This alteration of parameters is based on actively monitoring several factors in the external and internal radio environment, such as radio frequency spectrum, user behavior and network state.

In cognitive radio systems, the unlicensed (secondary) users can use the licensed spectrum as long as the licensed (primary) user is absent at some particular time slot and some specific geographic location. However, when the primary user reappears (i.e., comes back and is present again), ideally, the secondary users should vacate the spectrum instantly to avoid interference with the primary user.

The explosive growth in wireless services over the past several years illustrates the huge and growing demand of the business community, consumers and the government for wireless communications. With this growth of communication applications, the spectrum has become even more congested. Even though the Federal Communications Commission (FCC) has expanded some spectral bands, these frequency bands are exclusively assigned to specific users or service providers. Such expansion does not necessarily guarantee that the bands are being used most efficiently all the time.

In this regard, it has been shown that most of the radio frequency spectrum is vastly under-utilized. For example, cellular network bands are overloaded in most parts of the world, but amateur radio or paging frequencies are not. Moreover, those rarely used frequency bands are assigned to specific services that cannot be accessed by unlicensed users, even where transmissions of the unlicensed users will not introduce any interference to the licensed service.

To deal with the conflicts between spectrum congestion and spectrum under-utilization, cognitive radio has been recently proposed as a smart and agile technology, which allows non-legitimate users to utilize licensed bands opportunistically. By detecting particular spectrum "holes" and jumping into them rapidly to meet demand for spectrum, cognitive radio can improve the spectrum utilization significantly. To guarantee a high spectrum efficiency while avoiding interference to licensed users, cognitive radio should be able to adapt to spectrum conditions flexibly. Hence, improvements for cognitive radio are desired in the areas of spectrum sensing, dynamic frequency selection and transmit power control.

One of the most challenging problems of cognitive radio is the interference that occurs when a cognitive radio accesses a licensed band, but fails to notice the presence of the licensed user. To address this problem, cognitive radios should be designed to co-exist with the licensed user without creating harmful interference. Some conventional techniques that have been proposed to mitigate interference by the unlicensed user in cognitive radio systems include: (1) an orthogonal frequency division multiplexing (OFDM) approach proposed to avoid the interference by leaving a set of subchannels unused, (2) a transform domain communication system (TDCS) approach proposed to mitigate the interference by not placing the waveform energy at corrupted spectral locations and (3) a power control approach proposed to allow cognitive radios to adjust their transmit powers in order to guarantee quality of service (QoS) to the primary system based on a measurement of local signal to noise ratio (SNR) of the primary signal.

To avoid interference to licensed users, however, the transmit power of cognitive radios should be limited based on the locations of the licensed users. The third approach above begins from the assumption that cognitive radios have no way of knowing these locations of the licensed users, and then proposes the use of SNR as a proxy measurement, however, if the primary receiver is a TV antenna on a roof, it might measure a SNR of 0 dB at one location, while a cognitive radio on the ground at the same location might measure −10 dB, and thus SNR is a weak proxy that does not appear to directly correlate to the locations of the licensed users.

In this regard, it is difficult to locate the licensed users for the cognitive radio in practice because the channels between the cognitive radio and the licensed users are usually unknown. Furthermore, the environment where the system is in operation may have a large delay spread and, hence, the channel model between cognitive radios and primary users is complicated by fading, shadowing and path loss effects.

In another conventional system, a local oscillator (LO) leakage power is exploited to try to locate the primary receivers. However, such an approach is difficult to apply in practice because the approach requires a sensor node mounted close to the primary receivers to detect the LO leakage power, which is not very practical.

Accordingly, improved systems and methods are desired for improving power control for cognitive radio systems that do not depend upon additional structure, such as sensor nodes for detecting LO leakage power, being added close to the primary receivers. Moreover, systems are desired that control power of a cognitive radio based on a measurement, related to distance to licensed users, which is not inherently flawed as with the third approach discussed above.

The above-described deficiencies of current designs are merely intended to provide an overview of some of the problems of today's designs, and are not intended to be exhaustive. Other problems with the state of the art of cognitive radio and corresponding benefits of the invention may become further apparent upon review of the following description of various non-limiting embodiments of the invention.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments in a simplified form as a prelude to the more detailed description that follows.

For cognitive radio systems, the transmit power of a cognitive radio device is controlled so that the cognitive, unlicensed radio device does not interfere with the use of a shared spectrum by a primary, licensed device. In exemplary, non-limiting embodiments, the power control methodology of the invention includes determining a distance, or a function of the distance, between a primary transmitter of the primary device and the cognitive radio device based on sensing information from a spectrum sensing process. The maximum transmit power of the cognitive radio device is then dynamically regulated based on the distance, or the function of the distance, while considering a worst case scenario of an underlying cognitive radio model, to guarantee a quality of service requirement of the primary device.

BRIEF DESCRIPTION OF THE DRAWINGS

The various embodiments for the power control techniques based on spectrum sensing side information are further described with reference to the accompanying drawings in which.

DETAILED DESCRIPTION

Overview

As mentioned in the background, cognitive radio has been recently proposed as a promising technology to improve spectrum utilization efficiency by intelligently sensing and accessing some vacant bands, termed holes, of licensed users. In this regard, as described in the background, power control algorithms have been proposed to allow cognitive radios to adjust their transmit powers in order to guarantee QoS of the licensed users. However, presently, it is difficult in practice to locate licensed users with existing systems, and so interference with licensed users can result. For instance, the SNR characteristic measured by at least one conventional system is unreliable, error-prone and not correlated properly with distance.

In consideration of these limitations on current power control techniques, in accordance with various non-limiting embodiments, cognitive radios are allowed to operate in the presence of the licensed user by controlling the transmit power of cognitive radios. In order to minimize the interference to the licensed user, the transmit power of the cognitive radio is controlled by using spectrum sensing side information, guaranteeing QoS for licensed users in the presence of unlicensed cognitive radios.

In various non-limiting embodiments, power control is provided for cognitive radio systems based on spectrum sensing side information in order to mitigate the interference to the primary user due to the presence of cognitive radios. In one embodiment, first, the shortest distance between a licensed receiver and a cognitive radio is derived from the spectrum sensing side information. Then, the transmit power of the cognitive radio is determined based on this shortest distance to guarantee a QoS for the licensed user. Because the worst case is considered in this approach where the cognitive radio is the closest to the licensed user, the proposed power control approach can be applied to licensed users in any location.

Figure 1:
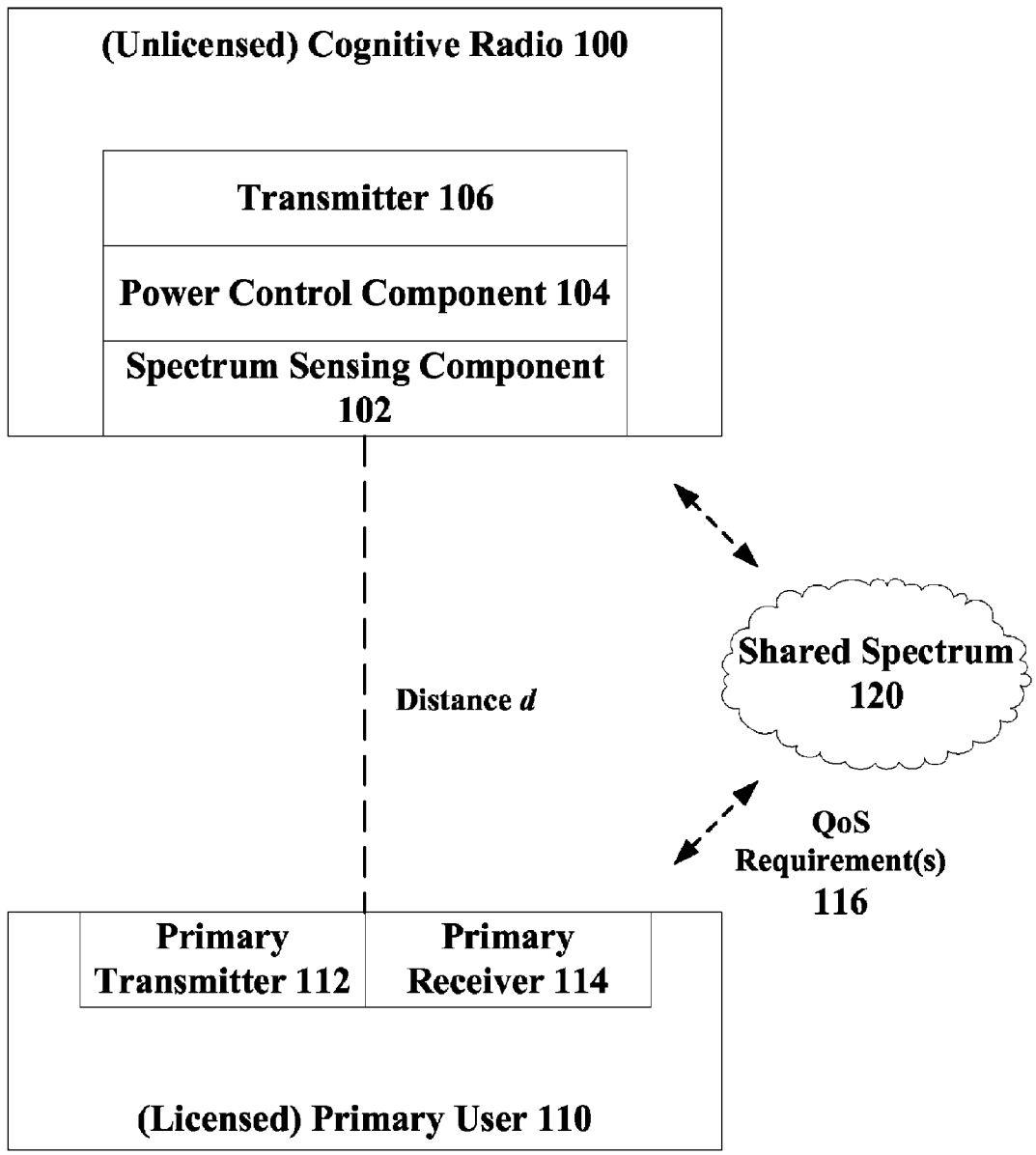
FIG. 1 illustrates a high-level block diagram of the power control based on spectrum sensing side information.

FIG. 1 is an exemplary, non-limiting block diagram generally illustrating the power control techniques applied to an unlicensed cognitive radio 100 in order to maintain QoS requirement(s) 116 for a licensed primary user 110 when the cognitive radio 100 and the licensed user 110 are both utilizing shared spectrum 120. As illustrated, primary user 110 includes a primary transmitter 112 and a primary receiver 114. As shown, cognitive radio 100 includes a transmitter 106, a power control module 104 and a spectrum sensing component 102. In accordance with the invention a distance d or a function of the distance d is determined by power control component 104 based on data determined by spectrum sensing component 102. The power of transmitter 106 is in turn controlled by power control module 104 as function of the distance d. By considering a worst case scenario for guaranteeing QoS requirements 116, power control module 104 allows cognitive radio 100 to share the spectrum 120 without interfering with the operation of the primary user 110.

Figure 2:
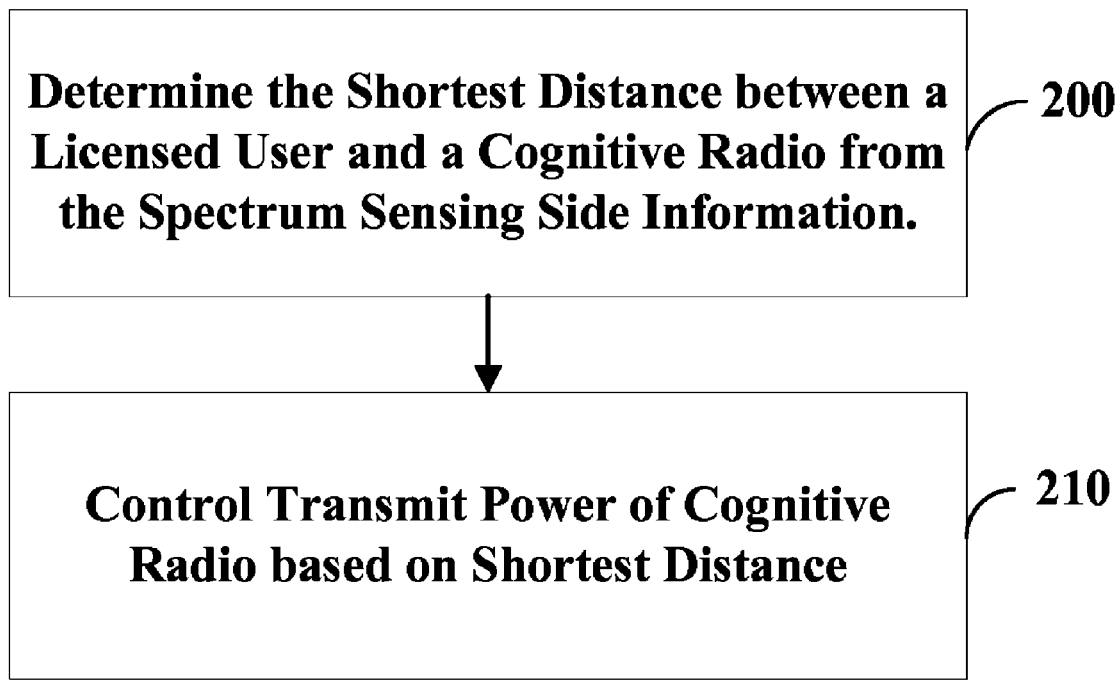
FIG. 2 is a flowchart illustrating a first non-limiting method for performing power control based on spectrum sensing side information.

The methodology of the invention is further illustrated in the exemplary non-limiting flow diagram of FIG. 2. At 200, the distance d between a primary transmitter (licensed) and a cognitive radio (unlicensed) is determined based on spectrum sensing side information. Then, at 210, in accordance with the processes described below, the transmit power of the cognitive radio is controlled based on the distance d in order to guarantee any QoS requirement(s) associated with the primary receiver.

Figure 3:
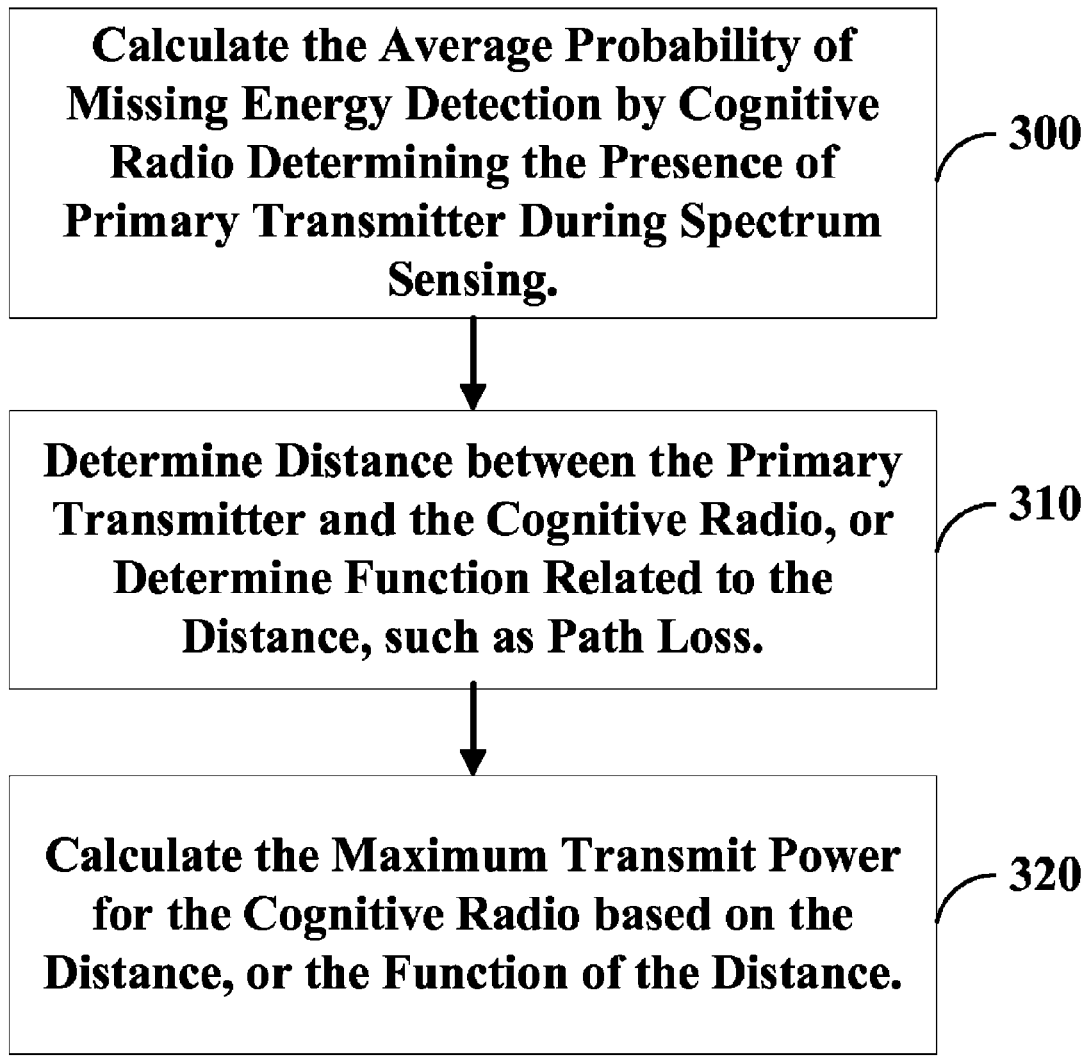
FIG. 3 is a flowchart illustrating a second non-limiting method for performing the power control based on spectrum sensing side information.

As illustrated in the flow diagram of FIG. 3 in exemplary non-limiting detail, at 300, the determination of the distance d may include calculating the average probability of missing energy detection with respect to determining the presence of the primary transmitter of the primary user during spectrum sensing of the cognitive radio. Then, at 310, based on the average probability of missing calculated at 300, the distance d between the primary transmitter and the cognitive radio (or a function based on the distance d, such as path loss due to the distance d) is determined. Then, at 320, the transmit power control of the invention is implemented by calculating the maximum transmit power for the cognitive radio as a function of the distance d (or the function, such as path loss) based on the distance d. As a result, the transmit power of the cognitive radio guarantees acceptable QoS for the primary receiver.

In the below description, various aspects of a system model are presented as a foundation for the various embodiments for implementing power control using side information of spectrum sensing described herein. Then, some non-limiting results are presented that demonstrate the efficacy of the invention. Then, some further background about cognitive radio systems is provided for some additional context relating to cognitive radio systems, followed by some non-limiting operating environments in which one or more aspects of the embodiments described herein may be implemented.

System Models

Figure 4:
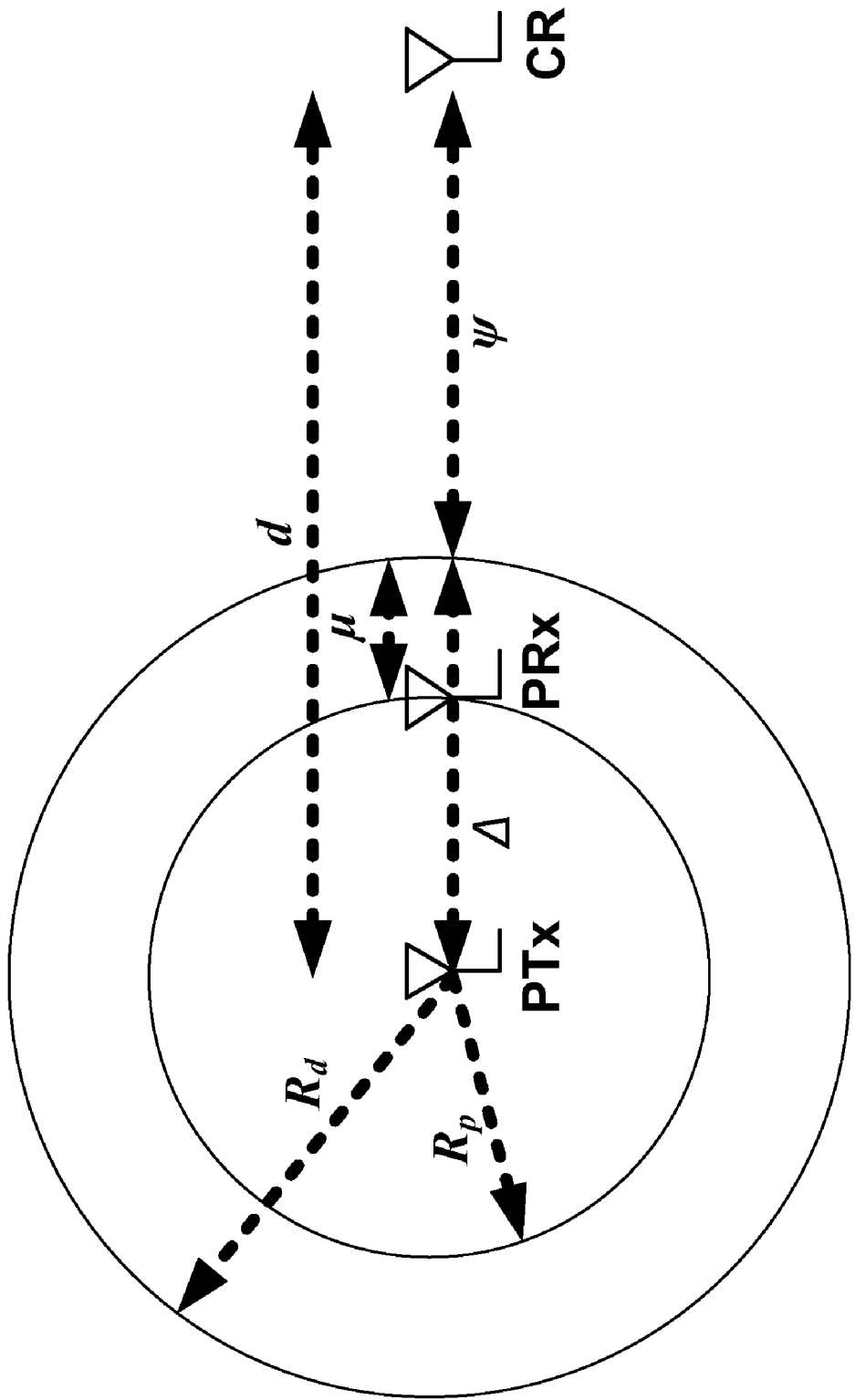
FIG. 4 is an exemplary, non-limiting block diagram showing a system model for the power control techniques described herein.

As foundation for the various embodiments of the invention described in more detail below, the invention considers a primary system (i.e., licensed user), formed by a transmitter-receiver pair, co-existing with a secondary user (cognitive radio) in the same area. A system model of interest in accordance with the invention is illustrated in FIG. 4, wherein primary transmitter PTx, primary receiver PRx and cognitive radio CR are depicted, respectively.

In the primary system, the primary transmitter PTx communicates with the primary receiver PRx with a transmit power $Q_p$. Some system parameters that are shown in FIG. 4 are explained as follows. The circle around the primary transmitter PTx with the radius $R_d$ (m) represents the decodable region within which the signal-to-noise ratio (SNR) of decodability occurs in the absence of interference to the primary receiver. The circle around the primary transmitter PTx with the radius $R_p$ (m) denotes the protection region within which the primary receiver PRx must be guaranteed successful reception even in the presence of cognitive radio CR. $\Delta$ (dB) is the signal attenuation due to the distance $R_d$. $\mu$ is the margin of protection in dB, which represents how much interference the primary system can tolerate above the noise floor.

In the secondary system, cognitive radio CR optionally works in the same frequency band as the primary system. Before accessing the channel, cognitive radio CR acts as a listener to detect from the received signals whether the primary system is in operation. Let d (m) denote the distance between the primary transmitter PTx and cognitive radio CR. In practice, it is difficult to obtain the value of d because the signals from the primary transmitter PTx and the channel are both unknown to cognitive radio CR.

Another challenging issue is allowing cognitive radio CR to access the same spectrum band where the primary user is operating. In such a case, cognitive radio CR may interfere with the primary system, thereby, degrading the QoS for the primary receiver. To reduce the interference, the transmit power $Q_c$ of cognitive radio CR is limited based on the tolerable interference to primary receiver PRx which directly depends on the distance between cognitive radio CR and primary receiver PRx. However, it is difficult for cognitive radio CR to locate primary receiver PRx, which can be at any location inside the protection region.

To address this problem, a worst case scenario is considered as a bound in accordance with the invention where primary receiver PRx is located on the crossing point between the boundary of the protection region and the line from primary transmitter PTx to cognitive radio CR as shown in FIG. 4. By limiting the transmit power of the cognitive radio CR for this worst case, acceptable QoS is maintained for the primary receiver PRx in operation at any location inside the protection region. In this case, it can be seen from FIG. 4 that the transmit power of cognitive radio CR, which is allowed to inflict tolerable interference on the primary receiver, depends on the SNR loss ($\mu+\psi$) in dB. It is also noted that the SNR loss due to the distance d is given by $\eta=\psi+\Delta$ (dB). Then, the transmit power control problem is converted to the problem of evaluating the SNR loss $\eta$ due to d for a given $\mu$ and $\Delta$.

The channel between any two terminals in FIG. 4 is assumed to experience flat Rayleigh fading and path loss. The propagation power attenuation is characterized by $Q(r)=r^{-\alpha}$ where r represents the distance and $\alpha$ denotes the power loss exponent (i.e., a constant typically in the range of 2~6). Herein, $\alpha=2$ is used which corresponds to a free-space attenuation parameter.

Power Control Based on Spectrum Sensing Side Information

As mentioned, in accordance with the invention, a power control approach in cognitive radio systems based on spectrum sensing side information is implemented to utilize the spectrum efficiently by allowing the cognitive radio to co-exist with the primary system. In accordance with various non-limiting embodiments of a method of the invention, the distance d between the primary transmitter and the cognitive radio is determined based on spectrum sensing side information. Then, the transmit power of the cognitive radio is controlled based on the distance d in order to guarantee a QoS requirement of the primary receiver.

In order to avoid the harmful interference to the primary (licensed) system, a cognitive radio senses the availability of the spectrum via a process known as spectrum sensing. The goal of spectrum sensing is to decide between the following two hypotheses:

$$H_0: x(t)=n(t) \quad 0<t\leq T \quad (1)$$

$$H_1: x(t)=hs(t)+n(t) \quad 0<t\leq T \quad (2) \qquad \text{Eqn. 1}$$

where T denotes the observation time, x(t) is the received signal at the cognitive radio, s(t) is the transmitted signal from the primary transmitter, n(t) is the zero-mean additive white Gaussian noise (AWGN) with the variance $\sigma^2$ and h denotes the Rayleigh fading channel coefficient. The instantaneous SNR is defined as $\gamma=|hs(t)|^2/\sigma^2$.

A challenge of spectrum sensing for cognitive radio is detecting the presence of the primary transmitter with little information about the channel h and the transmitted signal s(t). In such a scenario, the energy detector has been shown as the optimal detector for a zero-mean constellation of s(t). Specifically, the energy of the received signal, denoted by Y, is collected in a fixed bandwidth W and a time slot duration T and then compared with a pre-designed threshold $\lambda$. If $Y>\lambda$, then the cognitive radio assumes that the primary system is in operation, i.e., $H_1$. Otherwise, it assumes $H_0$.

The average probability of false alarm, detection and missing of energy detection over Rayleigh fading channels can be given by, respectively, $$P_f = E_\gamma[\text{Prob}\{H_1 \mid H_0\}] \qquad \text{Eqn. 2}$$
$$= \frac{\Gamma\left(u, \frac{\lambda}{2}\right)}{\Gamma(u)},$$

-continued $$P_d = E_\gamma[Prob\{H_1 | H_1\}]$$ Eqn. 3

$$= e^{-\frac{\lambda}{2}} \sum_{n=0}^{u-2} \frac{1}{n!} \left(\frac{\lambda}{2}\right)^n + \left(\frac{1+\bar{\gamma}}{\bar{\gamma}}\right)^{u-1} \times$$

$$\left[ e^{-\frac{\lambda}{2(1+\bar{\gamma})}} - e^{-\frac{\lambda}{2}} \sum_{n=0}^{u-2} \frac{1}{n!} \left(\frac{\lambda\bar{\gamma}}{2(1+\bar{\gamma})}\right)^n \right],$$

and $$P_m = E_\gamma[Prob\{H_0 | H_1\}] = 1 - P_d,$$ Eqn. 4 where $\bar{\gamma}$ denotes the average SNR at the cognitive radio. $E_\gamma[\bullet]$ represents the expectation over the random variable $\gamma$ which is Rayleigh distributed. $Prob\{\bullet\}$ stands for the probability. $\Gamma(\bullet,\bullet)$ is the incomplete gamma function and $\Gamma(\bullet)$ is the gamma function. Finally, u=TW with u=5 is used throughout this paper.

Figure 5:
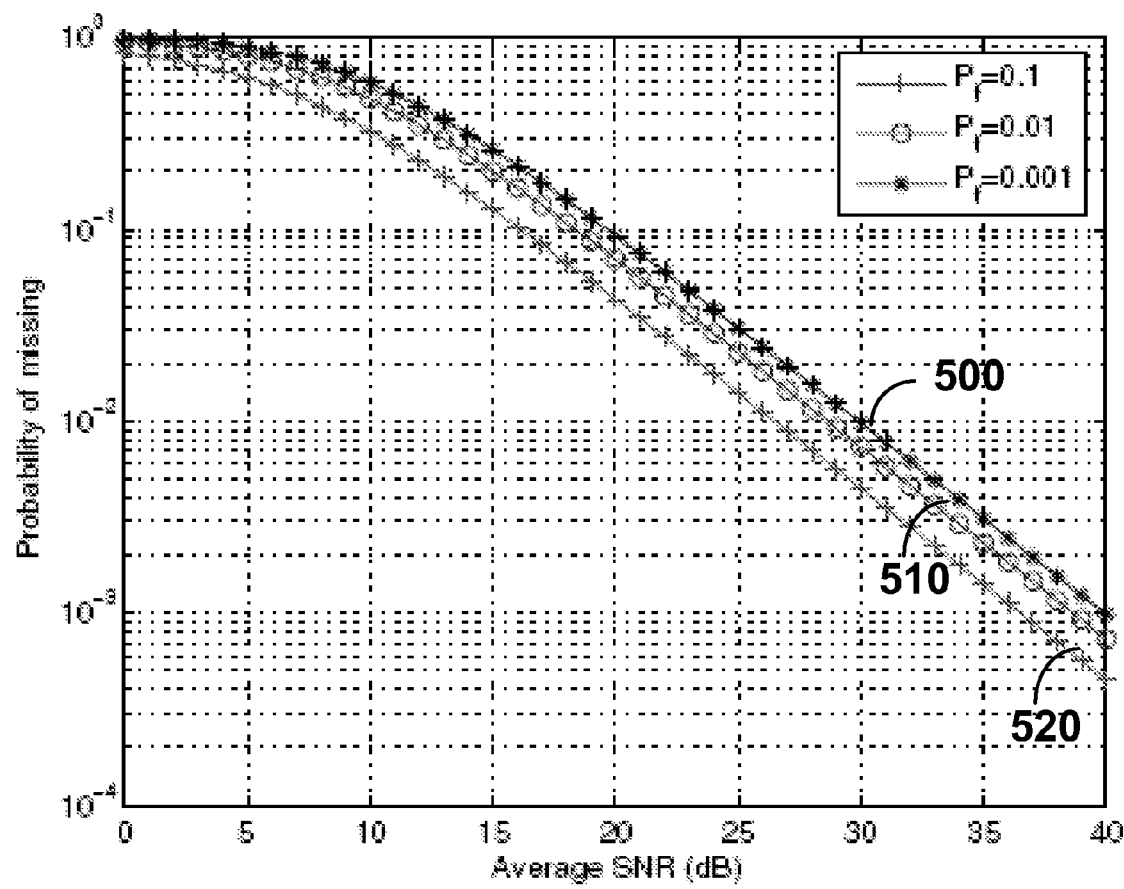
FIGS. 5 and 6 illustrate exemplary graphical demonstrations of effects on a probability of missing in connection with spectrum sensing for cognitive radio.

For each of curves 500, 510 and 520 of FIG. 5, $P_m$ is plotted versus the average SNR of the cognitive radio over Rayleigh fading under path loss effects for $P_f$=0.1, 0.01 and 0.001, respectively. FIG. 5 shows that when the average SNR increases, the probability of missing becomes smaller. For a specified average SNR, a larger $P_f$ will result in the decrease of $P_m$ because of the decrease of the threshold used in energy detection.

The path loss due to the distance d can be given by:

$$\eta \stackrel{\Delta}{=} -10\log(d^{-\alpha}), \text{ dB} = 10\log\left(\frac{Q_p}{\sigma^2}\right) - 10\log(\bar{\gamma}),$$ Eqn. 5 where $\log(\bullet)$ denotes the base-10 logarithm function. From Equation 5, the following equations are obtained:

$$\bar{\gamma} = \frac{Q_p}{\sigma^2} d^{-\alpha}$$ Eqn. 6

$$= \frac{Q_p/\sigma^2}{10^{\frac{\eta}{10}}}.$$

By substituting Equation 6 into Equation 3, a relationship between $P_m$ and d (or $\eta$) for the given $Q_p/\sigma^2$ and $\alpha$ is obtained, as follows:

$$P_m = f(d) \text{ or } P_m = f(\eta)$$ Eqn. 7

The distance d (or $\eta$) can be decided by $P_m$.

Figure 6:
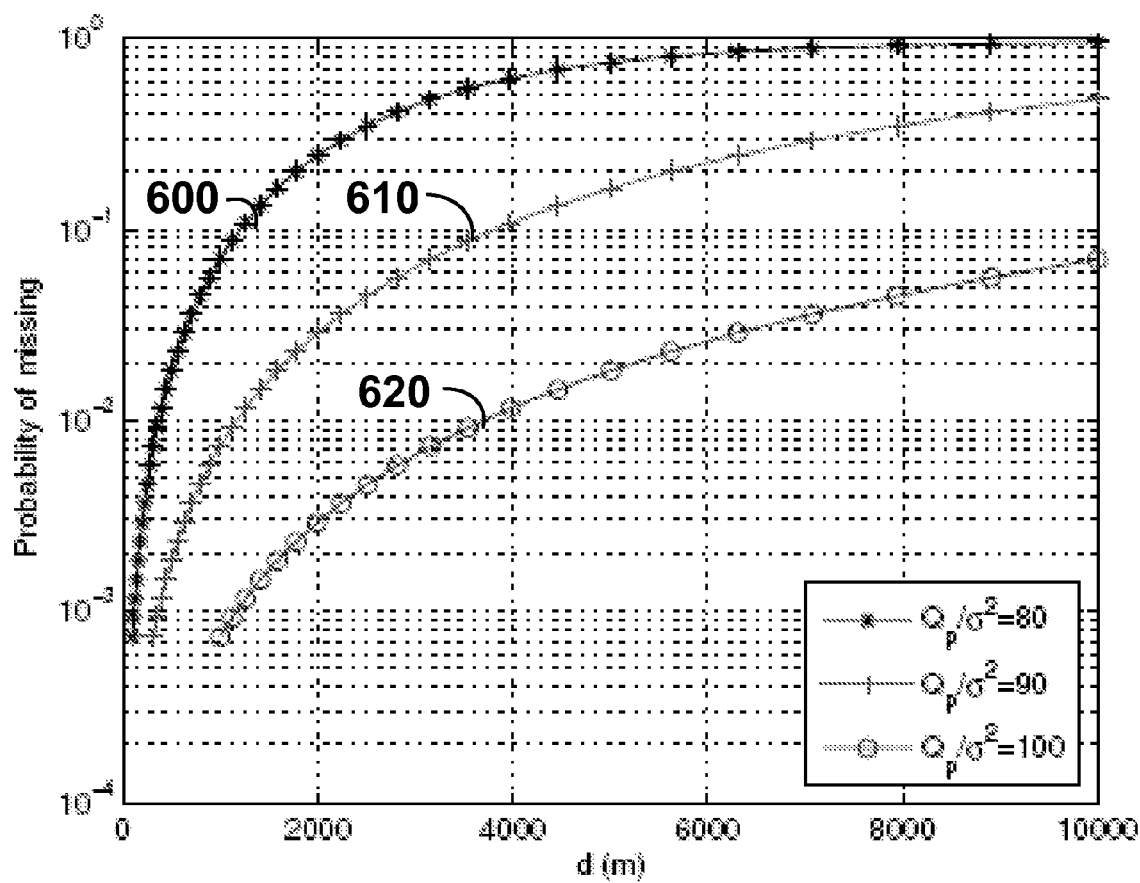

Each of curves 600, 610 and 620 of FIG. 6 shows $P_m$ versus the distance d for different transmit SNR $Q_p/\sigma^2$=80, 90 and 100, respectively, when $\alpha$=2 and $P_f$=0.01. Numerical results demonstrate that when the cognitive radio is far from the primary transmitter, there is a high probability of missing. For a fixed distance d, a higher transmit SNR can yield a better sensing performance, i.e., a lower $P_m$, because the received SNR $\bar{\gamma}$ is enhanced.

The miss detection occurs when the primary transmitter is in operation, but the cognitive radio fails to sense it. In this case, the probability of missing $P_m$ can be calculated as follows. Let $$I(Y_i) = \begin{cases} 1, & \text{if } Y_i > \lambda(10) \\ 0, & \text{otherwise}(11) \end{cases}$$ Eqn. 8 for i=1, . . . , N, where $Y_i$ denotes the energy collected by the cognitive radio in time slot i and N is the total number of time slots. Then, $P_m$ can be estimated as $$\hat{P}_m = 1 - \frac{1}{N} \sum_{i=1}^{N} I(Y_i).$$ Eqn. 9

Once $P_m$ is determined, d (or $\eta$) can be obtained from Equation 7.

When the presence of the primary user is not properly detected during the spectrum sensing process, the overall system performance will be degraded significantly due to the interference from the cognitive radio. Thus, in accordance with the invention, a transmit power control method is proposed to address this problem by limiting the interference due to the presence of the cognitive radio while also guaranteeing efficient spectrum utilization.

To allow the primary receiver to successfully decode the received signals from the primary transmitter in the presence of the cognitive radio, the signal-to-interference-plus-noise ratio (SINR) of the primary receiver should be guaranteed to be above a threshold of the decodability SNR $\gamma_d$ (in dB), i.e., SINR$\geq\gamma_d$. Then, the QoS for the primary receiver can be evaluated by:

$$\frac{Q_p}{Q_c + \sigma^2} \geq 10^{\frac{\gamma_d}{10}},$$ Eqn. 10 where $Q_p$ and $Q_c$ denote the received signal power from the primary transmitter and the cognitive radio, respectively. From Equation 10 and the parameters shown in FIG. 2, the following equations are obtained:

$$10\log\left(\frac{Q_c}{\sigma^2}\right) \leq \Delta + 10\log\left(10^{\frac{\mu}{10}} - 1\right) + 10\alpha\log\left((10^{\frac{\varphi}{10}})^{\frac{1}{\alpha}}\right) \stackrel{\Delta}{=} g(\psi)$$ Eqn. 11 for the constants $\alpha$ and $\mu$.

It can be seen from Equation 11 that the value of the allowable $Q_c$ depends on the SNR loss $\psi$. Since the location of the primary receiver is usually unknown for the cognitive radio, it is difficult to get the value of $\psi$. In accordance with the invention, the worst case is considered where the primary receiver is located at the closest point to the cognitive radio. In this case, from FIG. 4, the following equation pertains:

$$\psi = \eta - \Delta, \text{ dB}.$$ Eqn. 12

By substituting Equation 12 into Equation 11, $Q_c$ can be decided by $\eta$. Considering the case where $\eta = -10 \log(d^{-\alpha})$:

$$Q_c^{max} = g(\eta - \Delta) + 10\log(\sigma^2), \text{ dB}$$ Eqn. 13

$$= g(-10\log(d^{-\alpha}) - \Delta) + 10\log(\sigma^2), \text{ dB}$$

where $Q_c^{max}$ denote the maximum value of $Q_c$ in dB and d has been derived from the spectrum sensing side information above. As a result, the transmit power of the cognitive radio that guarantees acceptable QoS for the primary receiver is determined from the following steps for power control for cognitive radios in accordance with embodiments described herein:

Step 1: Calculate $P_m$ from Equation 9.
Step 2: Derive d or $\eta$ from Equation 7.
Step 3: Calculate $Q_c^{max}$ from Equation 13.

Some exemplary, non-limiting numerical results are presented to mathematically demonstrate the efficacy of the transmit power control method in cognitive radio systems in accordance with the present invention, as described above.

These numerical results assume that the system parameters are as follows:

$\Delta$=60 dB;
$\mu$=1 dB;
$Q_p/\sigma^2$=100 dB;
$P_f$=0.01;
$\alpha$=2.

Also, the channel environment is assumed to have flat Rayleigh fading and path loss. In order to allow the cognitive radio to share the spectrum with the primary system while guaranteeing threshold QoS to the primary receiver characterized by Equation 10, the transmit power of the cognitive radio should be controlled accordingly.

In the following, the efficacy of the invention is demonstrated by showing that the maximum transmit power of the cognitive radio is obtained. Because it is difficult to locate the primary receiver for the cognitive radio, as mentioned above, the worst case scenario is considered where the primary receiver is the nearest to the cognitive radio, as shown in FIG. 4.

Figure 7:
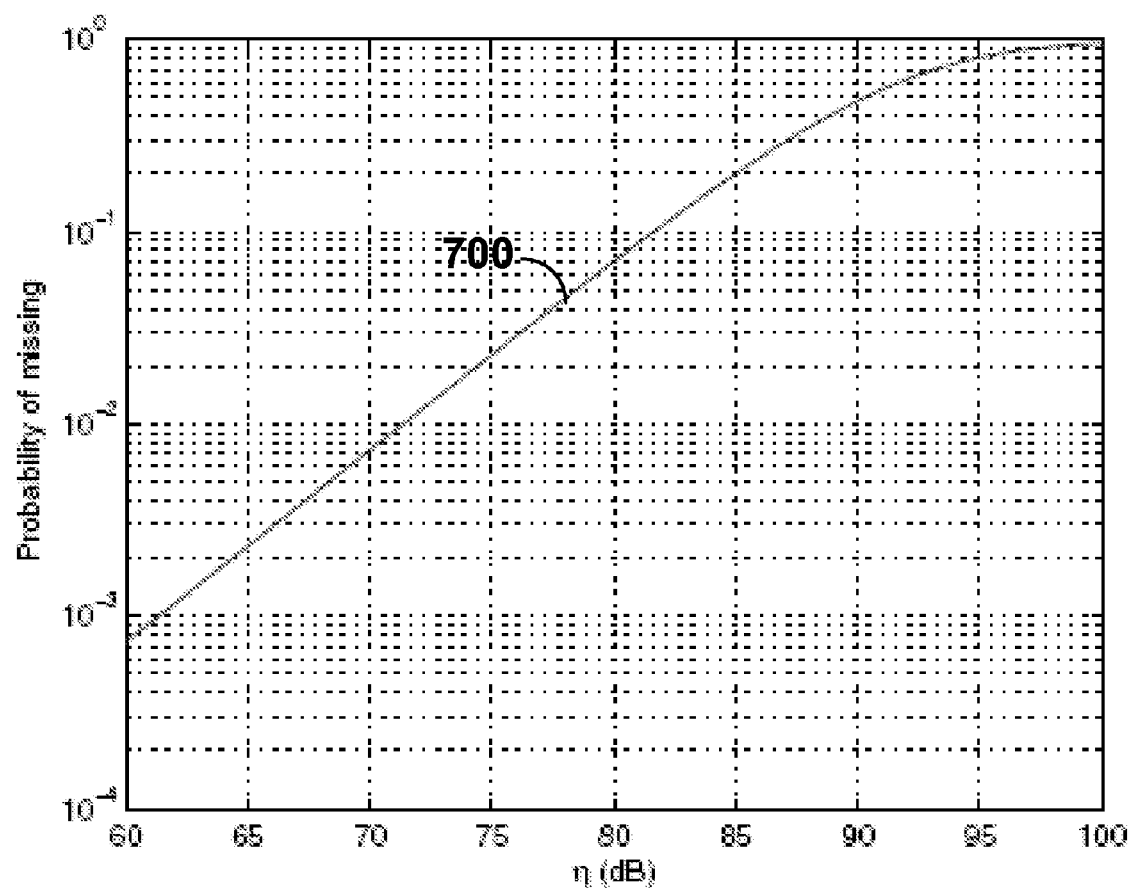
FIGS. 7 and 8 illustrate exemplary graphical demonstrations in connection with spectrum sensing for cognitive radio laying a foundation for different mathematical relationships.

From Equation 7, first, $P_m$ vs. $\eta$ (in dB) is obtained as shown by curve 700 of FIG. 7, illustrating the proportional relationship between $P_m$ and the SNR loss due to the distance d.

Figure 8:
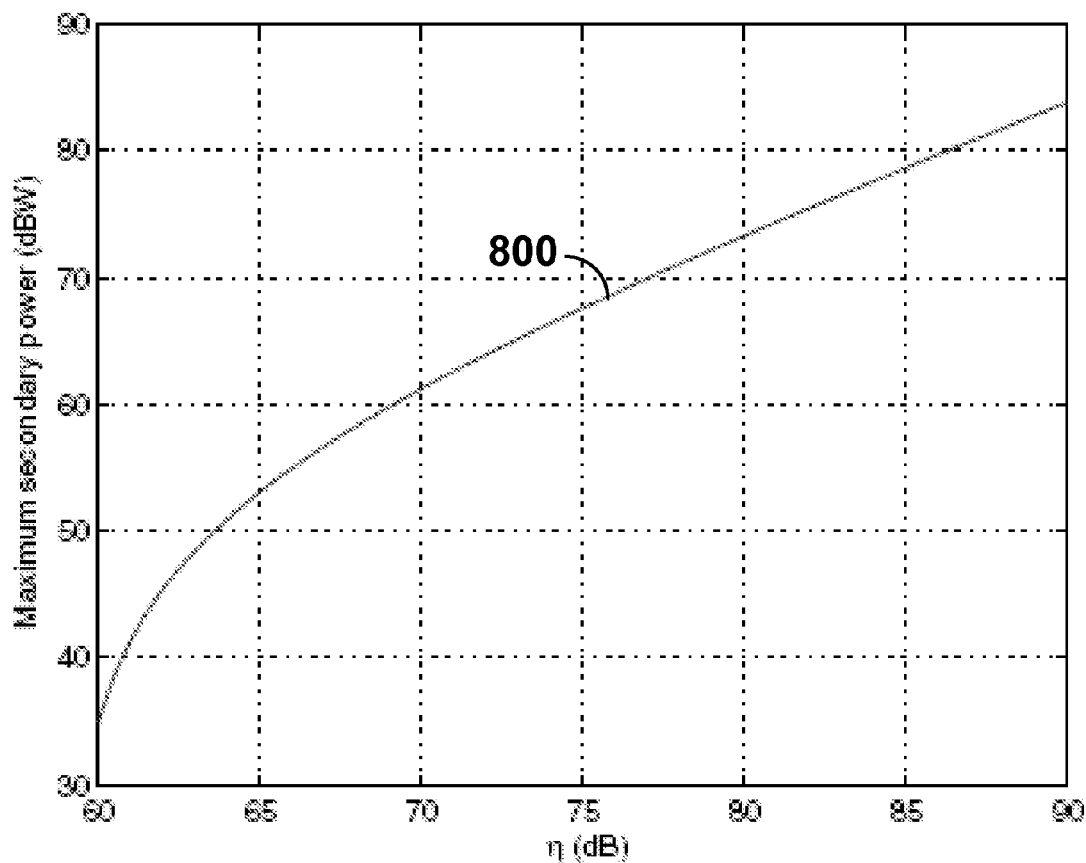

Then, from Equation 13, $Q_c^{max}$ vs. $\eta$ (in dB) is obtained as shown by curve 800 of FIG. 8. Curve 800 of FIG. 8 demonstrates that the allowable transmit power of the cognitive radio can be increased when a heavy SNR loss occurs between the cognitive radio and the primary receiver. This is reasonable because the interference power that the cognitive radio inflicts on the primary receiver is reduced by the large path loss.

Figure 9:
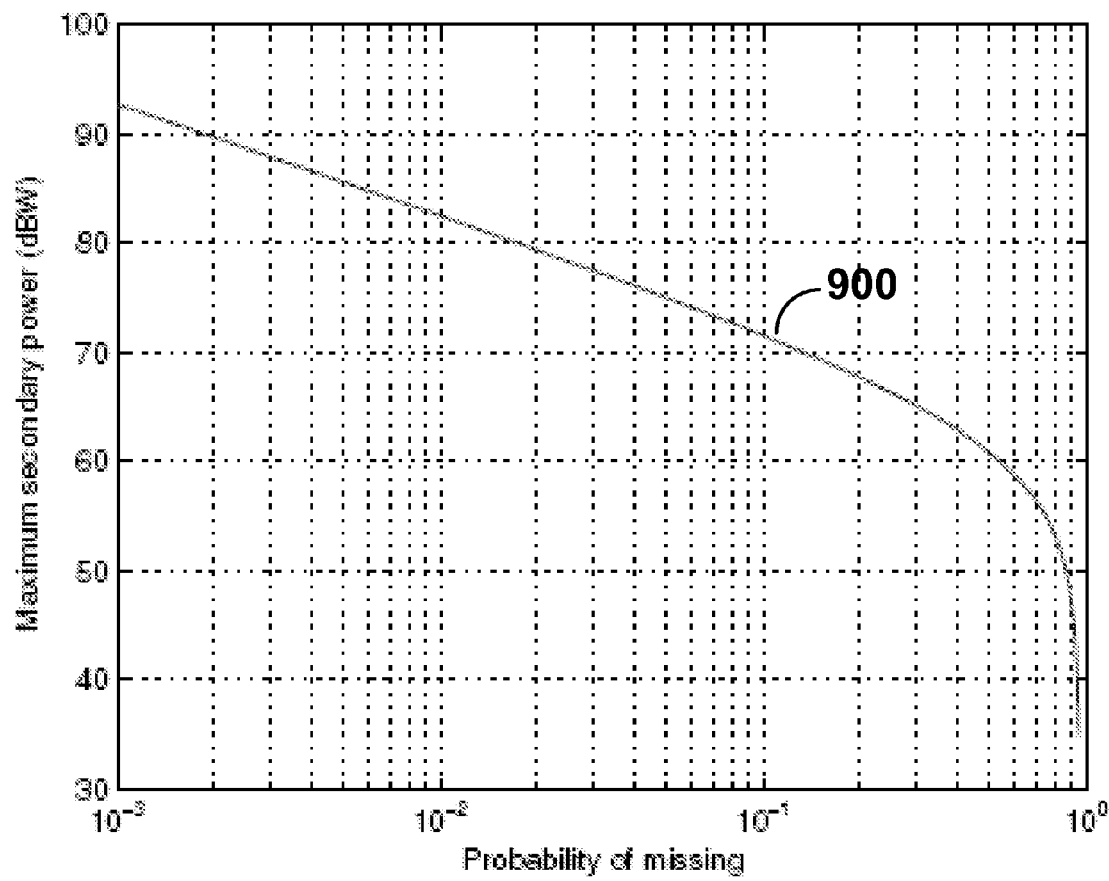
FIG. 9 is an illustrative graph showing results and benefits of the power control based on side information of spectrum sensing techniques.

Finally, from FIGS. 7 and 8, the relationship between $Q_c^{max}$ and $P_m$ is established as illustrated by curve 900 of FIG. 9. By calculating $P_m$ from Equation 9, the maximum transmit power $Q_c^{max}$ can be determined to guarantee the QoS for the licensed user in the presence of the cognitive radio. Because the maximum power of $Q_c$ is evaluated according to the worse case scenario where the primary receiver is the nearest to the cognitive radio, the power control approach of the invention can be applied to a primary receiver in any location.

Figure 10:
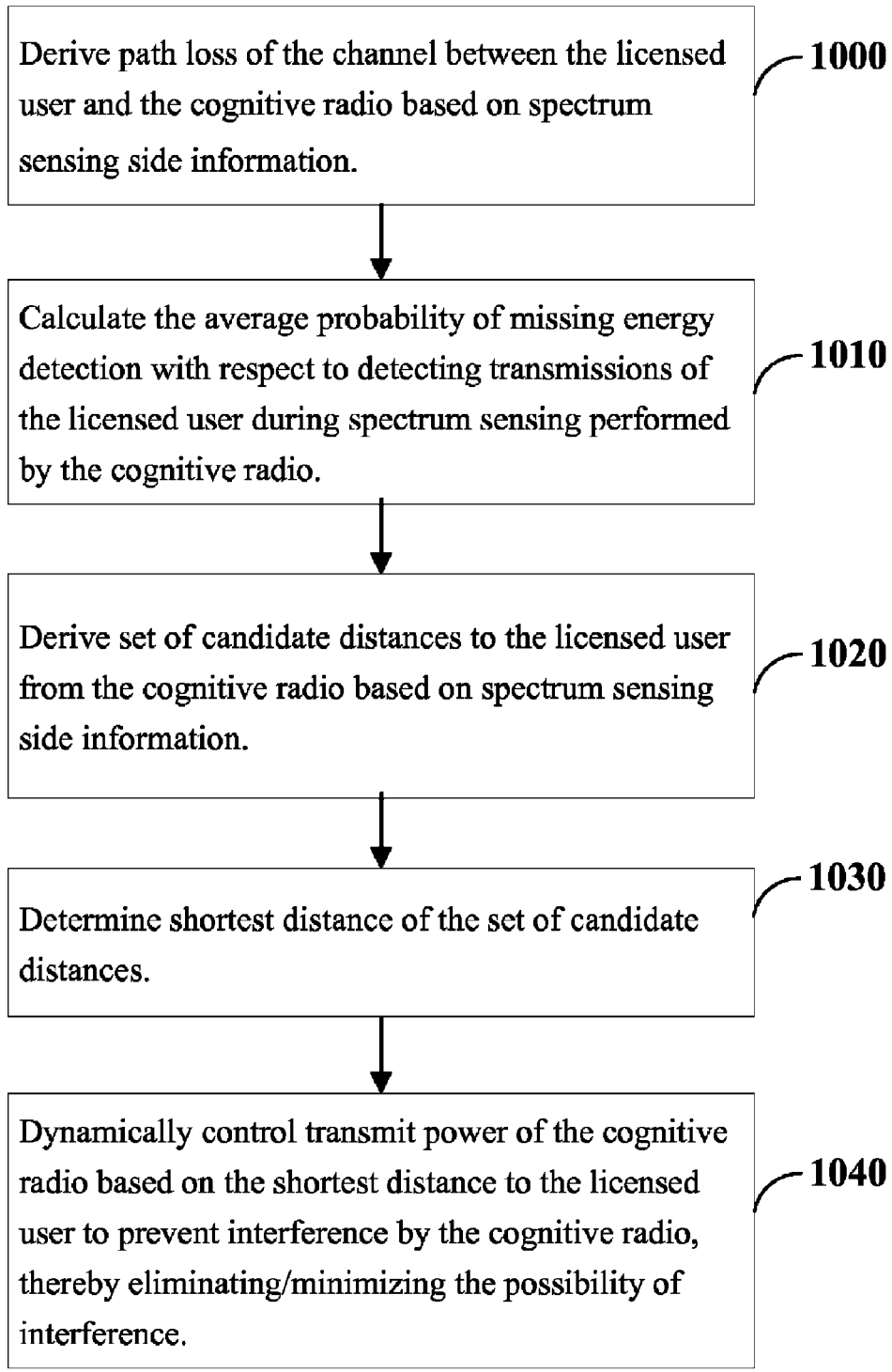
FIG. 10 is a flowchart illustrating a third non-limiting method for performing power control based on spectrum sensing side information.

FIG. 10 is another flow diagram of an exemplary method for processing spectrum sensing side information to dynamically control transmit power of a cognitive radio in a cognitive radio system in order to minimize/eliminate the possibility of interference by the cognitive radio with the licensed users. At 1000, path loss of the channel between the licensed user and the cognitive radio is derived based on the spectrum sensing side information. At 1010, the average probability of missing energy detection is calculated with respect to detecting transmissions of the licensed user during spectrum sensing. At 1020, a set, or range, of candidate distances to the licensed user from the cognitive radio are derived based on spectrum sensing side information. Next, from the set or range of distance, the shortest distance of the set of candidate distances is selected at 1030. Then, at 1040, based on the shortest distance to the licensed user (or shortest distances to the licensed users where there are multiple licensed users), the transmit power of the cognitive radio for transmissions in the shared spectrum is dynamically controlled to eliminate the possibility of interference with the licensed user(s). Since the worst case is factored into the determination, even where the worst case manifests, the licensed user will be able to continue without interference from the cognitive radios in the shared spectrum.

The invention thus applies in the context of a primary user and a cognitive radio sharing spectrum simultaneously. To limit the interference to the primary user, a power control approach is provided in accordance with the invention which intelligently adjusts the transmit power of the cognitive radio while maintaining a quality of service for the primary user. The transmit power is controlled by the spectrum sensing side information, the probability of missing which actually includes the implicit location information of the primary user. Numerical results show that the invention guarantees a reliable quality of service for the primary user in any location while greatly enhancing the spectrum utilization.

Supplemental Context for Cognitive Radio Systems

Cognitive radio was conceived as an ideal goal towards which a software-defined radio platform should evolve: a fully reconfigurable wireless black box that automatically changes its communication variables in response to network and user demands.

With respect to the telecommunications industry, regulatory bodies in various countries found that most of the radio frequency spectrum is utilized inefficiently. For instance, it was found that cellular network bands are overloaded in most parts of the world, but amateur radio and paging frequencies are not. Independent studies performed confirmed that observation and concluded that spectrum utilization depends strongly on time and place. Moreover, fixed spectrum allocation prevents rarely used frequencies (those assigned to specific services) from being used by unlicensed users, even when their transmissions would not interfere at all with the assigned service. Accordingly, the rationale has developed for allowing unlicensed users to utilize licensed bands whenever it would not cause any interference (by avoiding them whenever threshold legitimate user presence is sensed).

Recently, for example, intense competition for spectrum usage has arisen, especially for the spectrum below 3 GHz. Studies from the Federal Communication Commission (FCC) show that the utilization of licensed spectrum only ranges from 15% to 85%. Aimed at making full use of the spectrum (white space), IEEE 802.22 Wireless Region Area Network (WRAN) Group is established to utilize the spectrum between 54 MHz and 862 MHz. As a candidate for WRAN, cognitive radio techniques have been pursued to exploit the existence of spectrum holes.

There are two main types of cognitive radio depending on the set of parameters taken into account in deciding on transmission and reception changes: (1) full cognitive radio, or Mitola radio, in which every possible parameter observable by a wireless node or network is taken into account and (2) spectrum sensing cognitive radio in which only the radio frequency spectrum is considered. In addition, as another distinguishing factor, with licensed band cognitive radio, bands assigned to licensed users can be used apart from unlicensed bands. With unlicensed band cognitive radio, only unlicensed parts of the radio frequency spectrum are used.

Spectrum sensing cognitive radio has become of increasing interest to the telecommunications industry. Applications of spectrum sensing cognitive radio include, but are by no means limited to, emergency networks and WLAN higher throughput and transmission distance extensions. A focus of spectrum sensing cognitive radio is in designing high quality spectrum sensing devices and algorithms for exchanging spectrum sensing data between nodes.

In this regard, the main functions of cognitive radios are: (1) spectrum sensing, (2) spectrum management, (3) spectrum mobility and (4) spectrum sharing. Spectrum sensing by a cognitive radio involves detecting unused spectrum and sharing it without harmful interference with other users. In this sense, a goal of cognitive radio networks is to sense spectrum holes, and one way to detect spectrum holes is to efficiently analyze primary users of the network.

Spectrum management involves capturing the best available spectrum to meet user communication requirements, i.e., cognitive radios should decide on the best spectrum band to meet any QoS requirements over all available spectrum bands involving spectrum analysis and decision-making.

In turn, spectrum mobility is defined as the process when a cognitive radio user exchanges its operative frequency. Cognitive radio networks aim to use spectrum dynamically by allowing radio terminals to operate in the best available frequency band, maintaining seamless communication requirements during the transition to better spectrum. As the name implies, spectrum sharing endeavors to provide a fair spectrum scheduling method for all nodes.

Exemplary Networked and Distributed Environments

One of ordinary skill in the art can appreciate that the various embodiments of power control for cognitive radios described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may use the power control for cognitive radios as described for various embodiments of the subject disclosure.

Figure 11:
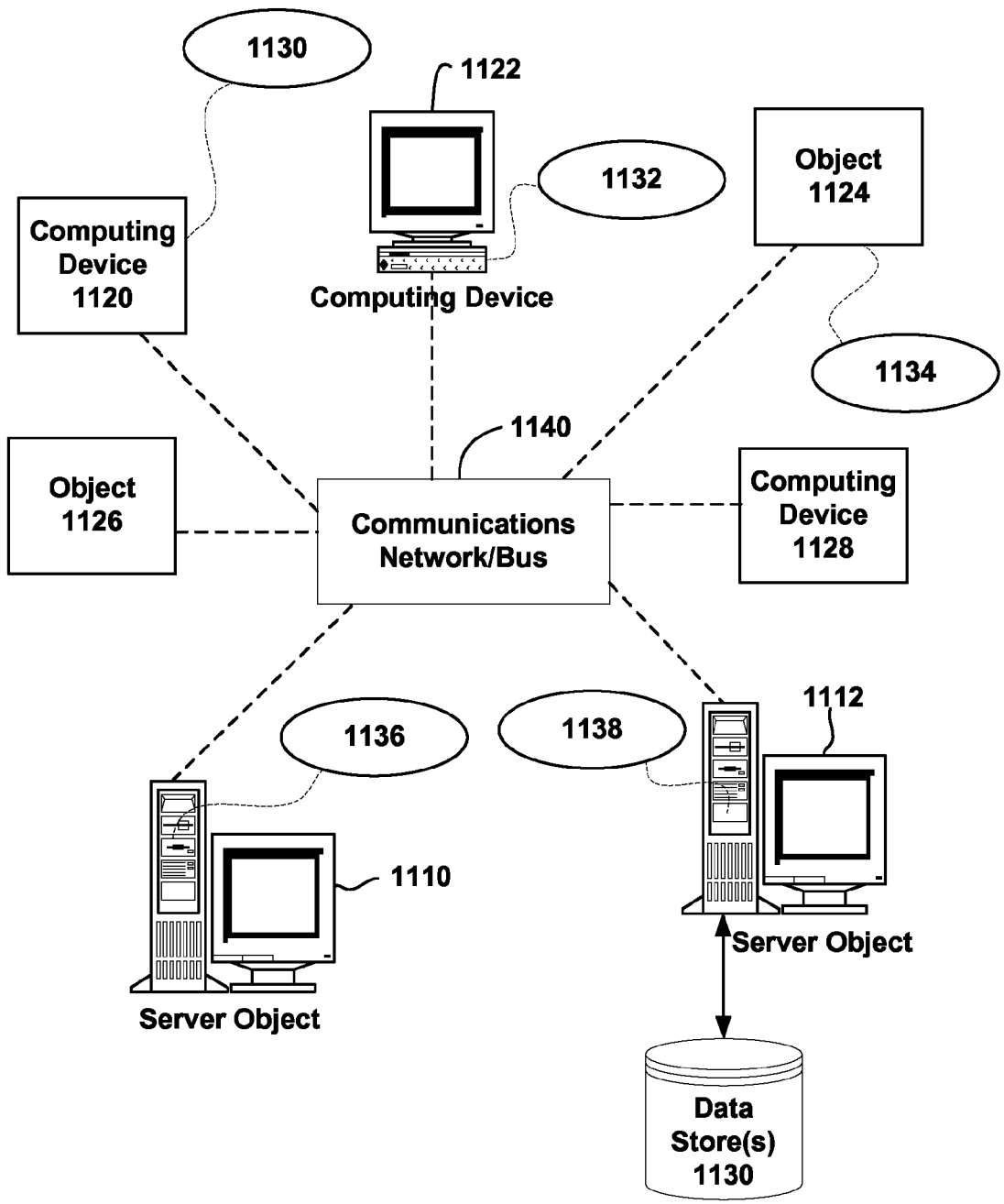
FIG. 11 is a block diagram representing an exemplary non-limiting networked environment.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that objects 1110, 1112, etc. and computing objects or devices 1120, 1122, 1124, 1126, 1128, etc. may comprise different devices, such as PDAs, audio/video devices, mobile phones, MP3 players, personal computers, laptops, etc.

Each object 1110, 1112, etc. and computing objects or devices 1120, 1122, 1124, 1126, 1128, etc. can communicate with one or more other objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each object 1110, 1112, etc. or 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the power control for cognitive radios provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the power control for cognitive radios as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 11, as a non-limiting example, computers 1120, 1122, 1124, 1126, 1128, etc. can be thought of as clients and computers 1110, 1112, etc. can be thought of as servers where servers 1110, 1112, etc. provide data services, such as receiving data from client computers 1120, 1122, 1124, 1126, 1128, etc., storing of data, processing of data, transmitting data to client computers 1120, 1122, 1124, 1126, 1128, etc., although any computer can be considered a client, a server, or both, depending on the circumstances. Any of these computing devices may be processing data, or requesting services or tasks that may implicate the power control for cognitive radios as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the power control for cognitive radios can be provided standalone, or distributed across multiple computing devices or objects.

In a network environment in which the communications network/bus 1140 is the Internet, for example, the servers 1110, 1112, etc. can be Web servers with which the clients 1120, 1122, 1124, 1126, 1128, etc. communicate via any of a number of known protocols, such as the hypertext transfer protocol (HTTP). Servers 1110, 1112, etc. may also serve as clients 1120, 1122, 1124, 1126, 1128, etc., as may be characteristic of a distributed computing environment.

Exemplary Computing Device

As mentioned, advantageously, the techniques described herein can be applied to any device where it is desirable to have secondary users use underutilized spectrum designated primarily for primary users. It should be understood, therefore, that handheld, portable and other computing devices and computing objects of all kinds are contemplated for use in connection with the various embodiments, i.e., anywhere that a device may request a service in a cognitive radio network. Accordingly, the below general purpose remote computer described below in FIG. 12 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 12:
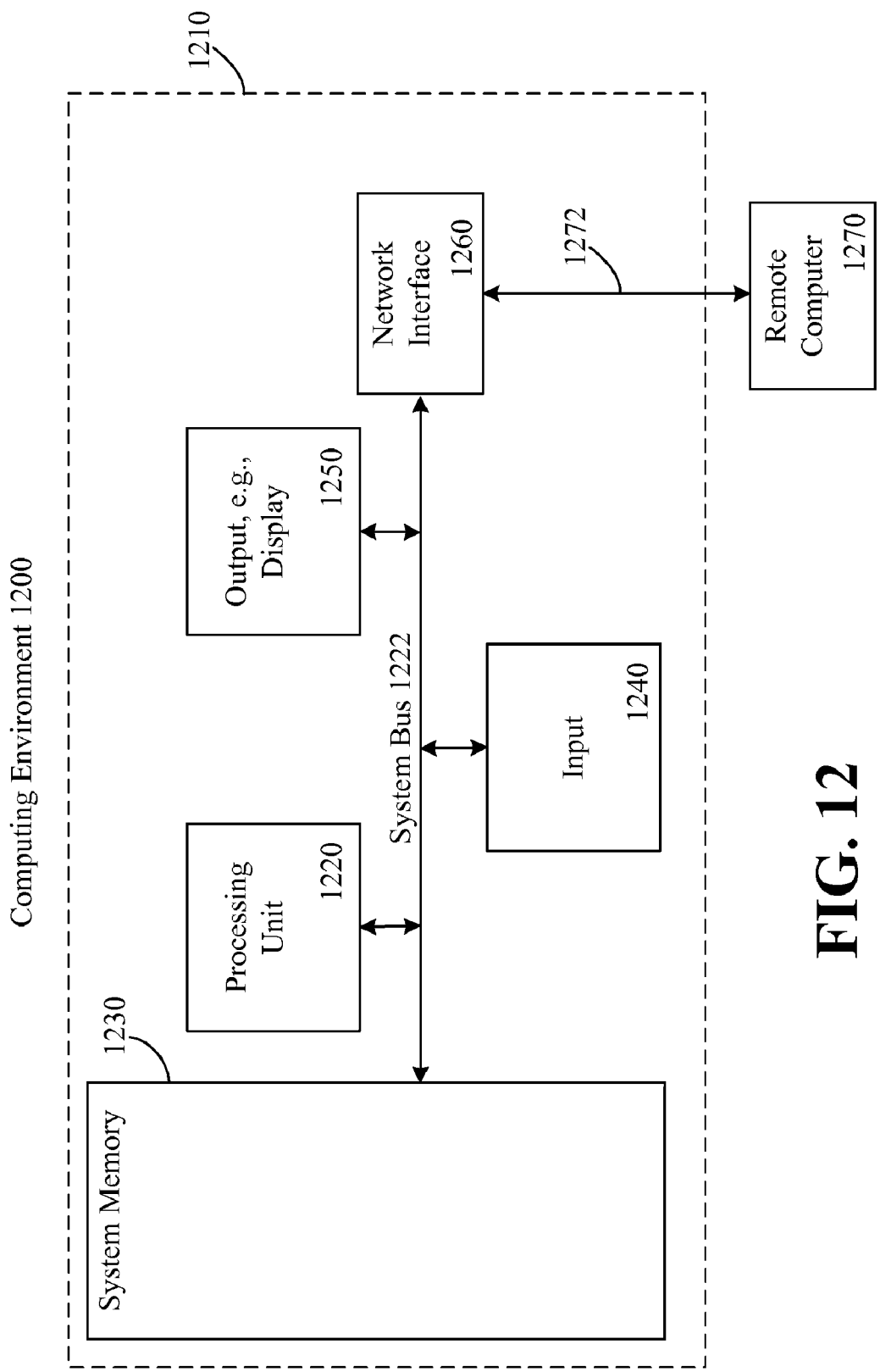
FIG. 12 is a block diagram representing an exemplary non-limiting computing system or operating environment.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither should the computing environment 1200 be interpreted as having any dependency or requirement relating to any one or combination of components illustrated in the exemplary operating environment 1200.

With reference to FIG. 12, an exemplary device for implementing one or more embodiments includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270, via network interface 1260. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet. It will be appreciated that the network connections shown and described are exemplary and other means of establishing a communications link between the computers may be used.

Exemplary Communications Networks and Environments

The above-described optimization algorithms and processes may be applied to any network, however, the following description sets forth some exemplary telephony radio networks and non-limiting operating environments for communications made incident to the power control algorithms and processes of the present invention. The below-described operating environments should be considered non-exhaustive, however, and thus the below-described network architecture merely shows one network architecture into which the present invention may be incorporated. One can appreciate, however, that the invention may be incorporated into any now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

Figure 13:
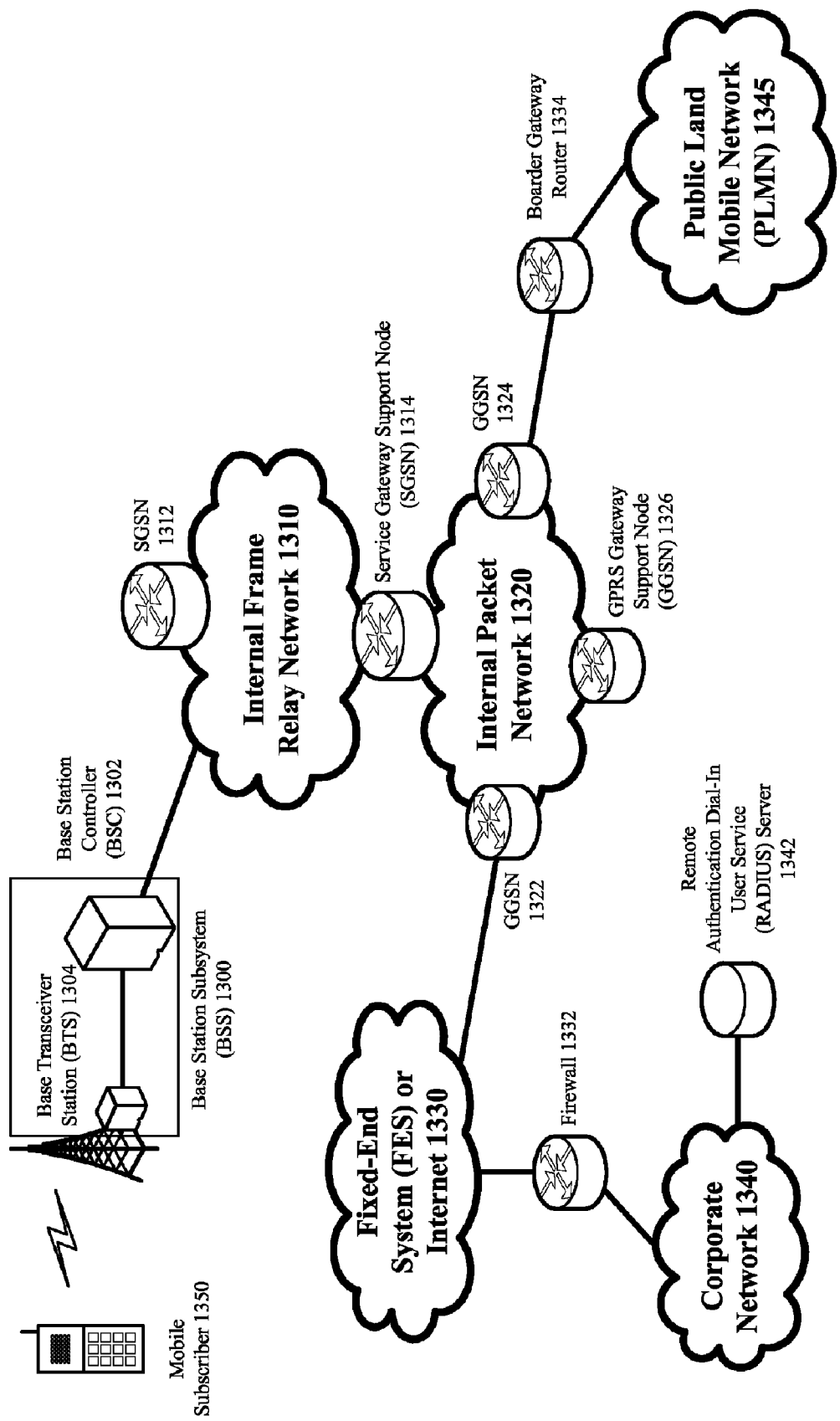
FIG. 13 illustrates an overview of a network environment suitable for transmission of data and service for the various embodiments described herein.

FIG. 13 depicts an overall block diagram of an exemplary packet-based mobile cellular network environment, such as a GPRS network, in which the invention may be practiced. In such an environment, there are a plurality of Base Station Subsystems ("BSS") 1300 (only one is shown), each of which comprises a Base Station Controller ("BSC") 1302 serving a plurality of Base Transceiver Stations ("BTS") such as BTSs 1304, 1306, and 1308. BTSs 1304, 1306, 1308, etc. are the access points where users of packet-based mobile devices become connected to the wireless network. In exemplary fashion, the packet traffic originating from user devices is transported over the air interface to a BTS 1308, and from the BTS 1308 to the BSC 1302.

Base station subsystems, such as BSS 1300, are a part of internal frame relay network 1310 that may include Service GPRS Support Nodes ("SGSN") such as SGSN 1312 and 1314. Each SGSN is in turn connected to an internal packet network 1320 through which a SGSN 1312, 1314, etc. can route data packets to and from a plurality of gateway GPRS support nodes (GGSN) 1322, 1324, 1326, etc. As illustrated, SGSN 1314 and GGSNs 1322, 1324, and 1326 are part of internal packet network 1320. Gateway GPRS serving nodes 1322, 1324 and 1326 mainly provide an interface to external Internet Protocol ("IP") networks such as Public Land Mobile Network ("PLMN") 1345, corporate intranets 1340, or Fixed-End System ("FES") or the public Internet 1330. As illustrated, subscriber corporate network 1340 may be connected to GGSN 1324 via firewall 1332; and PLMN 1345 is connected to GGSN 1324 via boarder gateway router 1334. The Remote Authentication Dial-In User Service ("RADIUS") server 1342 may be used for caller authentication when a user of a mobile cellular device calls corporate network 1340.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Thus, network elements that may implicate the functionality of the optimization algorithms and processes in accordance with the invention may include but are not limited to Gateway GPRS Support Node tables, Fixed End System router tables, firewall systems, VPN tunnels, and any number of other network elements as may be required by a given network.

As mentioned above, while exemplary embodiments have been described in connection with various computing devices and network architectures, the underlying concepts may be applied to any network system and any computing device or system in which it is desirable to perform cooperative spectrum sensing in a cognitive radio network.

Also, there are multiple ways to implement the same or similar functionality, e.g., an appropriate API, tool kit, driver code, operating system, control, standalone or downloadable software object, etc. which enables applications and services to request network spectrum in a cognitive radio network according to the embodiments herein. Thus, the above described embodiments are contemplated from the standpoint of an API (or other software object), as well as from a software or hardware object that provides any of the various capabilities described above. Moreover, various embodiments described herein can have aspects that are wholly in hardware, partly in hardware and partly in software, as well as in software.

While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the invention described herein may have aspects that are wholly in hardware, partly in hardware and partly in software, as well as in software. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom.

While exemplary embodiments refer to utilizing the present invention in the context of particular programming language constructs, specifications or standards, the invention is not so limited, but rather may be implemented in any language to enable the power control algorithms for cognitive radios as described herein. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method, comprising:
   determining a parameter relating to a distance between a primary transmitter of a primary device and a cognitive radio device including determining an average probability of a missing energy detection of the primary transmitter of the primary device based on sensing information from a spectrum sensing process that senses a presence of the primary device on a spectrum based on signals emitted from the primary transmitter; and
   dynamically controlling a transmit power of the cognitive radio device based on the parameter to meet a quality of service (QoS) requirement for the primary device.

2. The method according to claim 1, wherein the determining the parameter includes determining the distance between the primary transmitter and the cognitive radio device based on the sensing information.

3. The method according to claim 1, wherein the determining the parameter includes determining a path loss between the primary transmitter and the cognitive radio device based on the sensing information.

4. The method according to claim 1, wherein the determining the parameter includes determining the distance between the primary transmitter and the cognitive radio device based on the average probability of the missing energy detection.

5. The method according to claim 1, wherein the determining the parameter includes determining the parameter as a function of the distance based on the average probability of the missing energy detection.

6. The method according to claim 5, wherein the determining the parameter includes determining the parameter as a path loss function of the distance based on the average probability of the missing energy detection.

7. The method according to claim 1, further comprising increasing the transmit power of the cognitive radio device in response to a decrease in a signal to noise ratio between the primary device and the cognitive radio device.

8. A cognitive radio device, comprising:
   a spectrum sensing component configured to sense presence information about utilization of a designated portion of a network spectrum by a primary device, wherein the cognitive radio device shares the designated portion of the network spectrum with the primary device; and
   a power control component configured to control a transmission power of the cognitive radio device based on an average probability of a missing energy detection of a primary transmitter of the primary device output from the spectrum sensing component, wherein the cognitive radio device does not interfere with the primary device on the designated portion of the network spectrum, and the power control component is further configured to control the transmission power of the cognitive radio device based on the primary device being located in a worst case location in order to satisfy a quality of service (QoS) requirement of the primary device.

9. The cognitive radio device according to claim 8, wherein the power control component is further configured to determine a distance between a primary transmitter of the primary device and the cognitive radio device based on the presence information.

10. The cognitive radio device according to claim 8, wherein the power control component determines a path loss characteristic between a primary transmitter of the primary device and the cognitive radio device based on the presence information.

11. The cognitive radio device according to claim 8, wherein the power control component is further configured to control the transmission power of the cognitive radio device based on a function of the average probability of the missing energy detection.

12. The cognitive radio device according to claim 8, wherein the power control component is further configured to control the transmission power of the cognitive radio device based on a distance between the primary device and the cognitive radio device, wherein the distance is calculated based on the average probability of the missing energy detection.

13. The cognitive radio device according to claim 8, wherein the power control component is further configured to control the transmission power of the cognitive radio device based on a path loss function that is mathematically related to a distance between the primary device and the cognitive radio device, wherein the distance is calculated based on the average probability of the missing energy detection.

14. The cognitive radio device according to claim 8, wherein the transmission power of the cognitive radio device is indirectly proportional to a signal to noise ratio between the cognitive radio device and the primary device.

15. A non-transitory computer readable storage medium comprising computer executable instructions that, in response to execution by a computing device, cause the computing device to perform operations, comprising:
deriving a set of candidate distances between a cognitive radio device and at least one licensed device based on at least one average probability of at least one missing energy detection of the at least one licensed device determined from spectrum sensing side information including, determining a shortest distance of the set of candidate distances; and
dynamically controlling transmit power of the cognitive radio based on the shortest distance including substantially preventing interference by the cognitive radio device with the at least one licensed device.

16. The non-transitory computer readable storage medium of claim 15, wherein the deriving includes deriving, for each licensed device of the at least one licensed device, a range of possible distances to the licensed device from the cognitive radio device from the spectrum sensing side information received from the licensed device and the determining includes selecting a closest distance of the range.

17. The non-transitory computer readable storage medium according to claim 15, wherein the deriving includes deriving at least one path loss characteristic of at least one channel between the at least one licensed device and the cognitive radio device based on the spectrum sensing side information.

18. The non-transitory computer readable storage medium of claim 17, the operations further comprising dynamically increasing the transmit power of the cognitive radio device in response to increasing path loss on the at least channel between the at least one licensed device and the cognitive radio device.

19. A system, comprising:
means for determining a minimum distance, or a function related to the minimum distance, between a primary transmitter of a primary device and a cognitive radio device based on a determination of an average probability of a missing energy detection of the primary transmitter of the primary device from a spectrum sensing process for sensing a presence of the primary device on a shared spectrum based on signals emitted from the primary transmitter; and
means for dynamically controlling a maximum transmit power of the cognitive radio device based on the minimum distance, or the function related to the minimum distance, output from the means for determining to assist in meeting a quality of service (QoS) requirement of the primary device while the cognitive radio device shares the shared spectrum with the primary device.

\* \* \* \* \*